(12) United States Patent
Yu et al.

(10) Patent No.: US 8,899,358 B2
(45) Date of Patent: Dec. 2, 2014

(54) INTERFACE DESIGN OF TSP SHEAR CUTTERS

(75) Inventors: Feng Yu, Pleasant Grove, UT (US); Yi Fang, Provo, UT (US)

(73) Assignee: Smith International, Inc., Houston, TX (US)

( * ) Notice: Subject to any disclaimer, the term of this patent is extended or adjusted under 35 U.S.C. 154(b) by 497 days.

(21) Appl. No.: 13/282,894

(22) Filed: Oct. 27, 2011

(65) Prior Publication Data
US 2012/0103699 A1    May 3, 2012

Related U.S. Application Data

(60) Provisional application No. 61/407,596, filed on Oct. 28, 2010.

(51) Int. Cl.
| | |
|---|---|
| *E21B 10/46* | (2006.01) |
| *C22C 29/08* | (2006.01) |
| *B22F 3/12* | (2006.01) |
| *E21B 10/573* | (2006.01) |
| *C04B 37/02* | (2006.01) |

(52) U.S. Cl.
CPC ............. *B22F 3/12* (2013.01); *C04B 2237/083* (2013.01); *C22C 29/08* (2013.01); *C04B 2237/363* (2013.01); *C04B 2237/76* (2013.01); *C04B 2237/72* (2013.01); *C04B 2237/09* (2013.01); *C04B 2237/592* (2013.01); *C04B 2237/401* (2013.01); *E21B 10/5735* (2013.01); *C04B 37/026* (2013.01)
USPC .......... 175/432; 175/420.2; 175/428; 175/434

(58) Field of Classification Search
CPC ....................................... E21B 10/46
USPC ............... 175/420.2, 428, 434, 405.1
See application file for complete search history.

(56) References Cited

U.S. PATENT DOCUMENTS

| | | |
|---|---|---|
| 4,104,344 A | 8/1978 | Pope et al. |
| 4,288,248 A | 9/1981 | Bovenkerk et al. |
| 5,082,070 A * | 1/1992 | Obermeier et al. ........... 175/403 |

(Continued)

FOREIGN PATENT DOCUMENTS

CN        1576512 A        2/2005

OTHER PUBLICATIONS

International Search Report and Written Opinion issued in corresponding International Application No. PCT/US2011/058326 dated May 11, 2012 (10 pages).

(Continued)

*Primary Examiner* — Cathleen Hutchins
(74) *Attorney, Agent, or Firm* — Osha Liang LLP

(57) ABSTRACT

A method of forming a cutting element is disclosed, wherein the method includes forming a substrate body, forming an intermediate layer on the substrate body, forming a diamond table, and positioning the diamond table on the intermediate layer, such that the intermediate layer is disposed between the substrate body and the diamond table. The intermediate layer has a base portion having a base height and a ring portion having a ring height $H_R$, wherein the intermediate layer has a height $H_T$ equal to the sum of the base height and ring height. The diamond table has a cutting layer having a cutting layer diameter $D_1$ and a cutting layer height $H_E$ and a protrusion having a protrusion diameter $D_2$ and a protrusion height $H_P$.

28 Claims, 7 Drawing Sheets

(56) References Cited

U.S. PATENT DOCUMENTS

| | | | |
|---|---|---|---|
| 5,127,923 | A | 7/1992 | Bunting et al. |
| 5,469,927 | A | 11/1995 | Griffin |
| 5,472,376 | A | 12/1995 | Olmstead et al. |
| 7,163,070 | B2 | 1/2007 | Gienau et al. |
| 7,493,972 | B1 * | 2/2009 | Schmidt et al. ............... 175/432 |
| 7,757,790 | B1 | 7/2010 | Schmidt et al. |
| 2008/0223621 | A1 | 9/2008 | Middlemiss et al. |

OTHER PUBLICATIONS

International Preliminary Report on Patentability and Written Opinion issued in corresponding International Application No. PCT/US2011/058326 dated May 10, 2013 (7 pages).

Office Action issued in corresponding Chinese Application No. 201180051590.5; Dated Jun. 20, 2014 (7 pages).

* cited by examiner

INTERFACE DESIGN OF TSP SHEAR CUTTERS

CROSS-REFERENCE TO RELATED APPLICATIONS

This application claims priority to U.S. Provisional Application No. 61/407,596, filed on Oct. 28, 2010, which is herein incorporated by reference in its entirety.

BACKGROUND

1. Field

Embodiments disclosed herein relate generally to cutting elements for drilling earth formations. More specifically, embodiments disclosed herein relate to the interface design in shear cutters.

2. Background Art

Various types and shapes of earth boring bits are used in various applications in the earth drilling industry. Earth boring bits have bit bodies which include various features such as a core, blades, and cutter pockets that extend into the bit body or roller cones mounted on a bit body, for example. Depending on the application/formation to be drilled, the appropriate type of drill bit may be selected based on the cutting action type for the bit and its appropriateness for use in the particular formation.

Drag bits, often referred to as "fixed cutter drill bits," include bits that have cutting elements attached to the bit body, which may be a steel bit body or a matrix bit body formed from a matrix material such as tungsten carbide surrounded by a binder material. Drag bits may generally be defined as bits that have no moving parts. However, there are different types and methods of forming drag bits that are known in the art. For example, drag bits having abrasive material, such as diamond, impregnated into the surface of the material which forms the bit body are commonly referred to as "impreg" bits. Drag bits having cutting elements made of an ultra hard cutting surface layer or "table" (typically made of polycrystalline diamond material or polycrystalline boron nitride material) deposited onto or otherwise bonded to a substrate are known in the art as polycrystalline diamond compact ("PDC") bits.

PDC bits drill soft formations easily, but they are frequently used to drill moderately hard or abrasive formations. They cut rock formations with a shearing action using small cutters that do not penetrate deeply into the formation. Because the penetration depth is shallow, high rates of penetration are achieved through relatively high bit rotational velocities.

In PDC bits, polycrystalline diamond compact (PDC) cutters are received within cutter pockets, which are formed within blades extending from a bit body, and are typically bonded to the blades by brazing to the inner surfaces of the cutter pockets. The PDC cutters are positioned along the leading edges of the bit body blades so that as the bit body is rotated, the PDC cutters engage and drill the earth formation. In use, high forces may be exerted on the PDC cutters, particularly in the forward-to-rear direction. Additionally, the bit and the PDC cutters may be subjected to substantial abrasive forces. In some instances, impact, vibration, and erosive forces have caused drill bit failure due to loss of one or more cutters, or due to breakage of the blades.

In a typical PDC cutter, a compact of polycrystalline diamond ("PCD") (or other superhard material, such as polycrystalline cubic boron nitride) is bonded to a substrate material, which is typically a sintered metal-carbide, to form a cutting structure. PCD comprises a polycrystalline mass of diamond grains or crystals that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

PCD may be formed by subjecting a volume of diamond grains to certain high-pressure/high-temperature ("HPHT") conditions in the presence of a sintering aid or binder. Conventionally, the sintering aid or binder is provided in the form of a solvent metal catalyst material, such as one or more elements from Group VIII of the Periodic table. The solvent metal catalyst may be added and mixed with the diamond grains prior to HPHT processing and/or may be provided during the HPHT process by infiltration from a substrate comprising the solvent metal catalyst as one of its constituent materials.

A conventional PDC cutter may be formed by placing a cemented carbide substrate into a HPHT container. A diamond layer may be formed upon the substrate by placing a mixture of diamond grains or diamond grains and catalyst binder atop the substrate in the container. The container is then loaded into a HPHT device that is configured and operated to subject the container and its contents to a desired HPHT condition. In doing so, metal binder migrates from the substrate and passes through the diamond grains to promote intergrowth between the diamond grains. As a result, the diamond grains become bonded to each other to form the diamond layer, and the diamond layer is in turn bonded to the substrate. The substrate often comprises a metal-carbide composite material, such as tungsten carbide. The deposited diamond body is often referred to as a "diamond layer", a "diamond table", or an "abrasive layer."

An example of a prior art PDC bit having a plurality of cutters with ultra hard working surfaces is shown in FIG. 1. The drill bit 100 includes a bit body 110 having a threaded upper pin end 160 and a cutting end 140. The cutting end 140 typically includes a plurality of ribs or blades 120 arranged about the rotational axis L (also referred to as the longitudinal or central axis) of the drill bit and extending radially outward from the bit body 110. Cutting elements, or cutters, 180 are embedded in the blades 120 at predetermined angular orientations and radial locations relative to a working surface 190 and with a desired back rake angle and side rake angle against a formation to be drilled.

A plurality of orifices 130 are positioned on the bit body 110 in the areas between the blades 120, which may be referred to as "gaps" or "fluid courses." The orifices 130 are commonly adapted to accept nozzles. The orifices 130 allow drilling fluid to be discharged through the bit in selected directions and at selected rates of flow between the blades 120 for lubricating and cooling the drill bit 100, the blades 120 and the cutters 180. The drilling fluid also cleans and removes the cuttings as the drill bit 100 rotates and penetrates the geological formation. Without proper flow characteristics, insufficient cooling of the cutters 180 may result in cutter failure during drilling operations. The fluid courses are positioned to provide additional flow channels for drilling fluid and to provide a passage for formation cuttings to travel past the drill bit 100 toward the surface of a wellbore (not shown).

Conventional PCD includes 85-95% by volume diamond and a balance of the binder material, which is present in PCD within the interstices existing between the bonded diamond grains. Binder materials that are typically used in forming PCD include Group VIII elements, with cobalt (Co) being the most common binder material used.

Conventional PCD is stable at temperatures of up to 700-750° C., after which observed increases in temperature may result in permanent damage to and structural failure of PCD. In particular, heat caused by friction between the PCD and the work material causes thermal damage to the PCD in the form of cracks, which lead to spalling of the diamond layer and delamination between the diamond layer and substrate. This deterioration in PCD is due to the significant difference in the coefficient of thermal expansion of the binder material, which is typically cobalt, as compared to diamond. Upon heating of PCD, the cobalt and the diamond lattice will expand at different rates, which may cause cracks to form in the diamond lattice structure and result in deterioration of the PCD. High operating temperatures may also lead to back conversion of the diamond to graphite causing loss of microstructural integrity, strength loss, and rapid abrasive wear.

In order to overcome this problem, strong acids may be used to "leach" the cobalt from the diamond lattice structure (either a thin volume or the entire body) to at least reduce the damage experienced from different expansion rates within a diamond-cobalt composite during heating and cooling. Examples of "leaching" processes can be found, for example, in U.S. Pat. Nos. 4,288,248 and 4,104,344. Briefly, a strong acid, typically nitric acid or combinations of several strong acids (such as nitric and hydrofluoric acid) may be used to treat the diamond table, removing at least a portion of the co-catalyst from the PDC composite. By leaching out the cobalt, thermally stable polycrystalline ("TSP") diamond may be formed. In certain embodiments, only a select portion of a diamond composite is leached, in order to gain thermal stability with less effect on impact resistance. As used herein, the term thermally stable polycrystalline (TSP) includes both of the above (i.e., partially and completely leached) compounds. Interstitial volumes remaining after leaching may be reduced by either furthering consolidation or by reinfiltrating the volume with a secondary material. An example of reinfiltration can be found in U.S. Pat. No. 5,127,923.

However, some of the problems described above that plague PCD cutting elements, i.e., chipping, spalling, partial fracturing, cracking or exfoliation of the cutting table, are also often encountered in TSP cutters or other types of cutters having an ultra hard diamond-like cutting table such as polycrystalline cubic boron nitride (PCBN) bonded on a cemented carbide substrate. It has been observed that carbide substrates may have a higher coefficient of thermal expansion than a diamond layer (e.g., PCD, TSP). TSP materials, in particular, have a coefficient of thermal expansion that is sufficiently different from that of conventional substrate materials (such as WC-Co). Thus, during sintering, for example, both the cemented carbide body and diamond layer are heated to elevated temperatures forming a bond between the diamond layer and the cemented carbide substrate. As the diamond layer and substrate cool down, the substrate shrinks more than the diamond because of the carbide's higher coefficient of thermal expansion. Consequently, stresses referred to as thermally induced stresses, or residual stresses, are formed at the interface between the diamond and the substrate. Further, different contractions between the diamond layer and carbide substrate generate stresses in both bodies.

Furthermore, in some prior art disclosures, the difference in the coefficient of thermal expansion between conventional substrate materials and TSP has resulted in mounting TSP bodies directly to a device for use rather than using an adjoining substrate. In particular, the difference in thermal expansion between the TSP body and a substrate, and the poor wetability of the TSP body diamond surface due to the substantial absence of solvent metal catalyst, makes it very difficult to bond TSP to conventionally used substrates.

Moreover, residual stresses are formed on the diamond layer from a mismatch in the bulk modulus between the diamond layer and substrate. Specifically, the high pressure applied during the sintering process causes the carbide to compress more than the diamond layer due to the carbide's lower bulk modulus. After the diamond is sintered onto the carbide and the pressure is removed, the carbide tries to expand more than the diamond imposing a tensile residual stress on the diamond layer. These stresses may induce larger stresses, which may ultimately lead to material failure, because diamond and substrate materials typically have a high modulus (i.e., stiffness).

The cooling down effect (caused by different coefficients of thermal expansion) and the pressure release effect (caused by different bulk modulus) counteract with each other. The cooling down effect over powers the pressure release effect under commonly used sintering conditions, thereby leaving different net contractions in the diamond layer and carbide substrate.

To avoid these issues, some prior art designs use non-planar interfaces ("NPI") between the substrate and a diamond cutting layer. However, the formation of a NPI becomes more difficult to achieve when sintering a preformed diamond layer to a carbide substrate because any imprecision between mating non-planar surfaces of the diamond and substrate may cause cracking in the diamond layer. Some prior art embodiments try to improve mating precision between preformed diamond layers and substrates by using substrate material in powder form, such as carbide powder, between the non-planar surfaces.

FIGS. 2A and 2B show exemplary prior art cutting elements. The cutting element 200 shown in FIG. 2A has a conventional planar interface 202 formed between a diamond table 220 and a carbide substrate 270. The cutting element 200 shown in FIG. 2B has a conventional NPI 202 formed between a diamond table 220 and a substrate 270. A portion of the substrate 270 extends into the diamond table 220. In an exemplary prior art embodiment, the substrate 270 may be preformed into a carbide body, and diamond powder and optionally catalyst material may be placed on the upper surface of the substrate 270. Upon HPHT processing of the cutting element 200, diamond to diamond bonding occurs to form the diamond table 220. Although prior art NPIs, such as the one shown in FIG. 2B, may have reduced amounts of residual stress when compared to cutting elements having planar interfaces, such as the one shown in FIG. 2A, prior art configurations of diamond cutting elements continue to exhibit failure from residual stresses.

Accordingly, there exists a continuing need for developments in improving the life of cutting elements.

SUMMARY

In one aspect, embodiments of the present disclosure relate to a method of forming a cutting element that includes forming a substrate body, forming an intermediate layer on the substrate body, forming a diamond table, and positioning the diamond table on the intermediate layer, such that the intermediate layer is disposed between the substrate body and the diamond table. The intermediate layer has a base portion having a base height and a ring portion having a ring height $H_R$, wherein the intermediate layer has a height $H_T$ equal to the sum of the base height and ring height. The diamond table has a cutting layer having a cutting layer diameter $D_1$ and a cutting layer height $H_E$ and a protrusion having a protrusion diameter $D_2$ and a protrusion height $H_P$.

In another aspect, embodiments disclosed herein relate to a cutting element having a diamond table and a substrate mounted to the diamond table. The diamond table has a cutting layer having a cutting layer diameter $D_1$ and a cutting layer height $H_E$ and a protrusion having a protrusion diameter $D_2$ and a protrusion height $H_P$. The substrate has a substrate body and an intermediate layer disposed between the substrate body and the diamond table, wherein the intermediate layer has a base portion having a base height, a ring portion having a ring height $H_R$, and a height $H_T$ equal to the sum of the base height and ring height. A non-planar interface is formed between the diamond table and the intermediate layer, wherein the protrusion extends from the cutting layer into the substrate.

Other aspects and advantages of the invention will be apparent from the following description and the appended claims.

DETAILED DESCRIPTION

Figure 1:
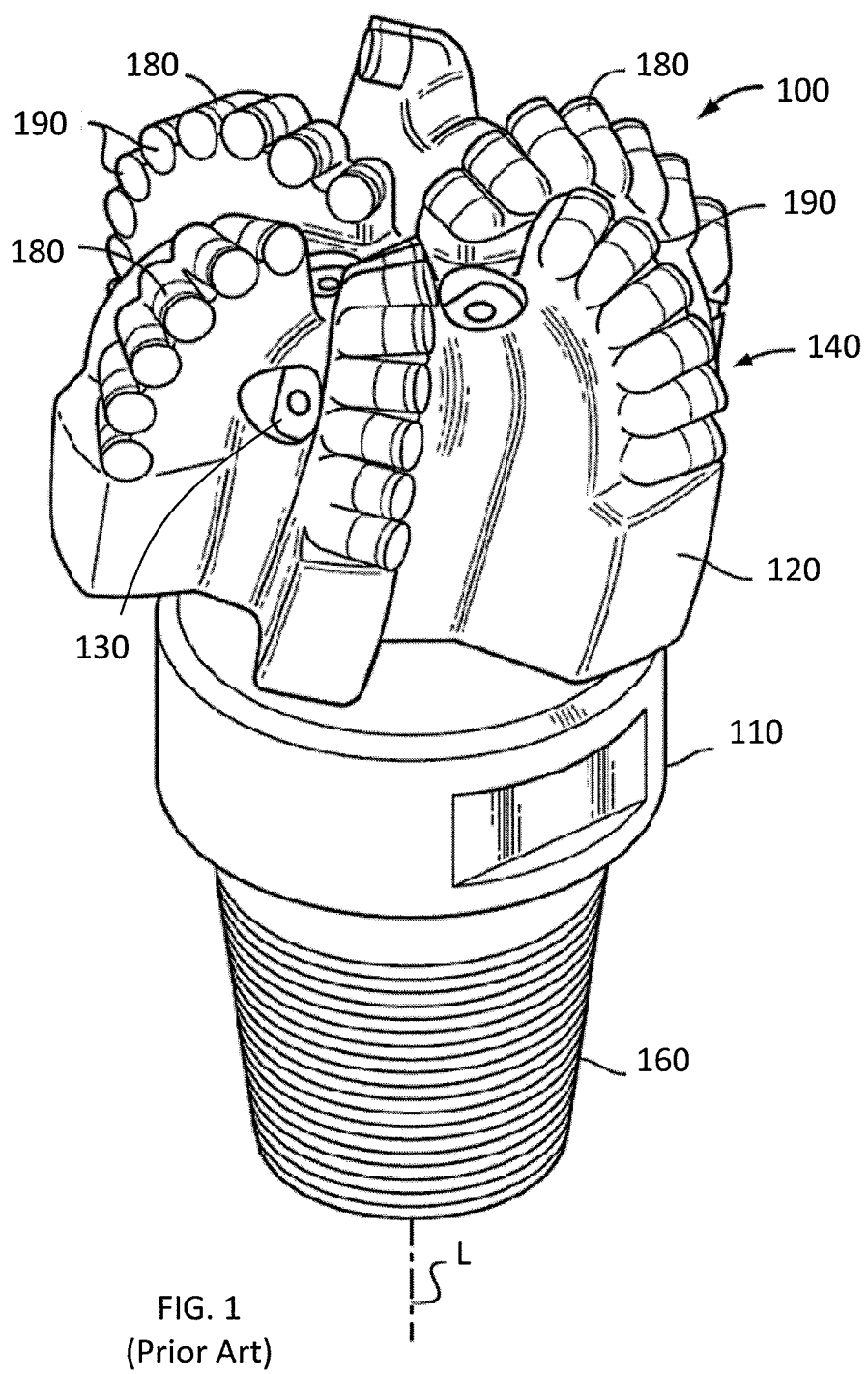
FIG. 1 shows a side view of a conventional drag bit.
Figure 2A:
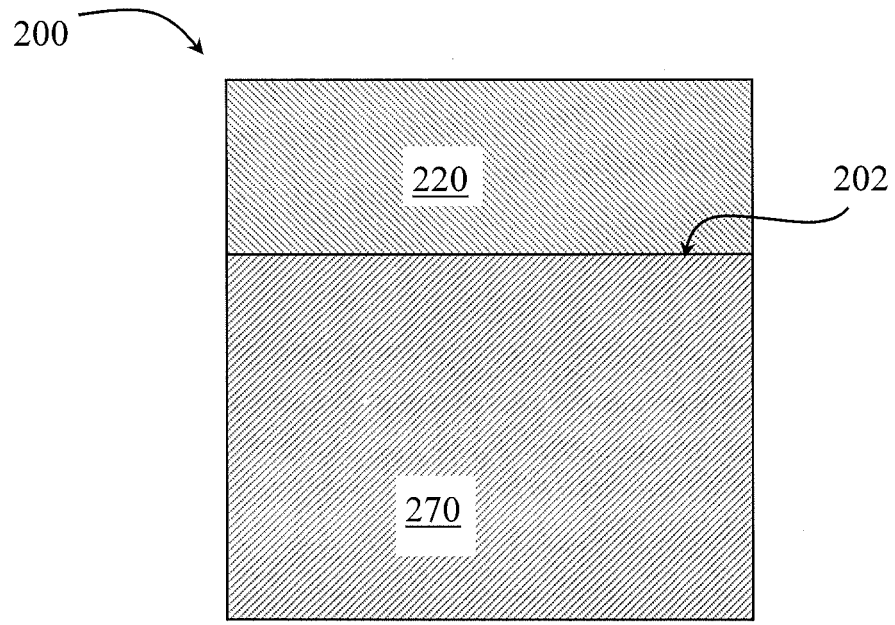
FIGS. 2A and 2B show cross-sectional views of prior art diamond cutting elements.
Figure 2B:
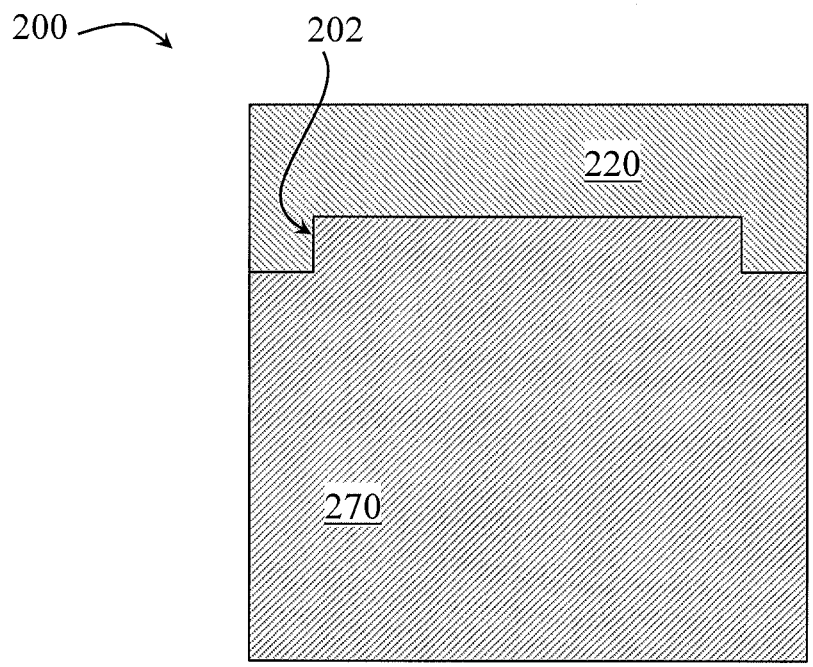

The present disclosure relates to cutting elements with improved interface design characteristics. Particularly, certain embodiments relate to a non-planar interface ("NPI") between a diamond table and a substrate of a shear cutting element. The diamond table may be preformed into a polycrystalline diamond (PCD) or a thermally stable polycrystalline diamond (TSP) table comprising a cutting layer and a protrusion that extends from the cutting layer into the substrate.

As used herein, the term "PCD" refers to polycrystalline diamond that has been formed, at high pressure/high temperature ("HPHT") conditions, through the use of a solvent metal catalyst, such as those included in Group VIII of the Periodic table. The term "thermally stable polycrystalline diamond" or "TSP," as used herein, refers to intercrystalline bonded diamond that includes a volume or region that has been rendered substantially free of the solvent metal catalyst used to form PCD, or the solvent metal catalyst used to form PCD remains in the region of the diamond body but is otherwise reacted or rendered ineffective in its ability to adversely impact the bonded diamond at elevated temperatures as discussed above.

In a typical application, a polycrystalline diamond compact (PDC) body or other superhard material is attached to a substrate material, which is typically a sintered metal-carbide, to form a cutting structure. Such PDC bodies may include, for example, conventional PCD, high density PCD (diamond content greater than 92 percent by volume), TSP diamond (substantially free of secondary phases), and/or non-conventional PCD having a thermally stable secondary phase. Attachment to a substrate allows for attachment of the PDC cutter to cutting and/or wear devices by conventional methods, such as brazing, welding, etc. Without a substrate, a PDC body must be attached to the cutting and/or wear device by interference fit, which is not practical and does not provide a strong attachment to promote a long service life. Exemplary embodiments described herein may relate to TSP shear cutters, which may be used on downhole cutting tools, such as drag bits or reamers, for example.

Further, in conventional applications, a diamond body may be formed upon a substrate by placing diamond powder or diamond powder and a catalyst material on a substrate surface and subjecting the assembly to a sintering process, such as HPHT processing, for example. In such embodiments, a diamond body is formed and attached to the substrate simultaneously. However, according to embodiments of the present disclosure, a pre-sintered (i.e., preformed) diamond body may be attached to a substrate after it has been formed. As used herein, a preformed diamond body refers to diamond bodies, such as PCD or TSP, that have undergone diamond to diamond bonding prior to being attached to a substrate.

According to embodiments of the present disclosure, a "substrate" includes two regions: a substrate body and an intermediate layer. The term "substrate" is used herein to refer to both regions (the substrate body and intermediate layer) in the form they take upon formation of a cutting element (e.g., such as by HPHT processing). The terms "substrate body" and "intermediate layer" are used herein to describe the components of a substrate, in the form they are in prior to formation of the cutting element (e.g., before the substrate body and intermediate layer undergo HPHT processing to form a TSP cutting element). The substrate body may be preformed into a solid body, which may comprise a metal-carbide composite material (e.g., tungsten carbide) and a metal binder (e.g., cobalt or other Group VIII metals). The intermediate layer may be formed of the same material as the substrate body, or a different metal-carbide composite material. Further, the intermediate layer may be in powder and/or solid form prior to attaching a diamond layer.

Figure 3:
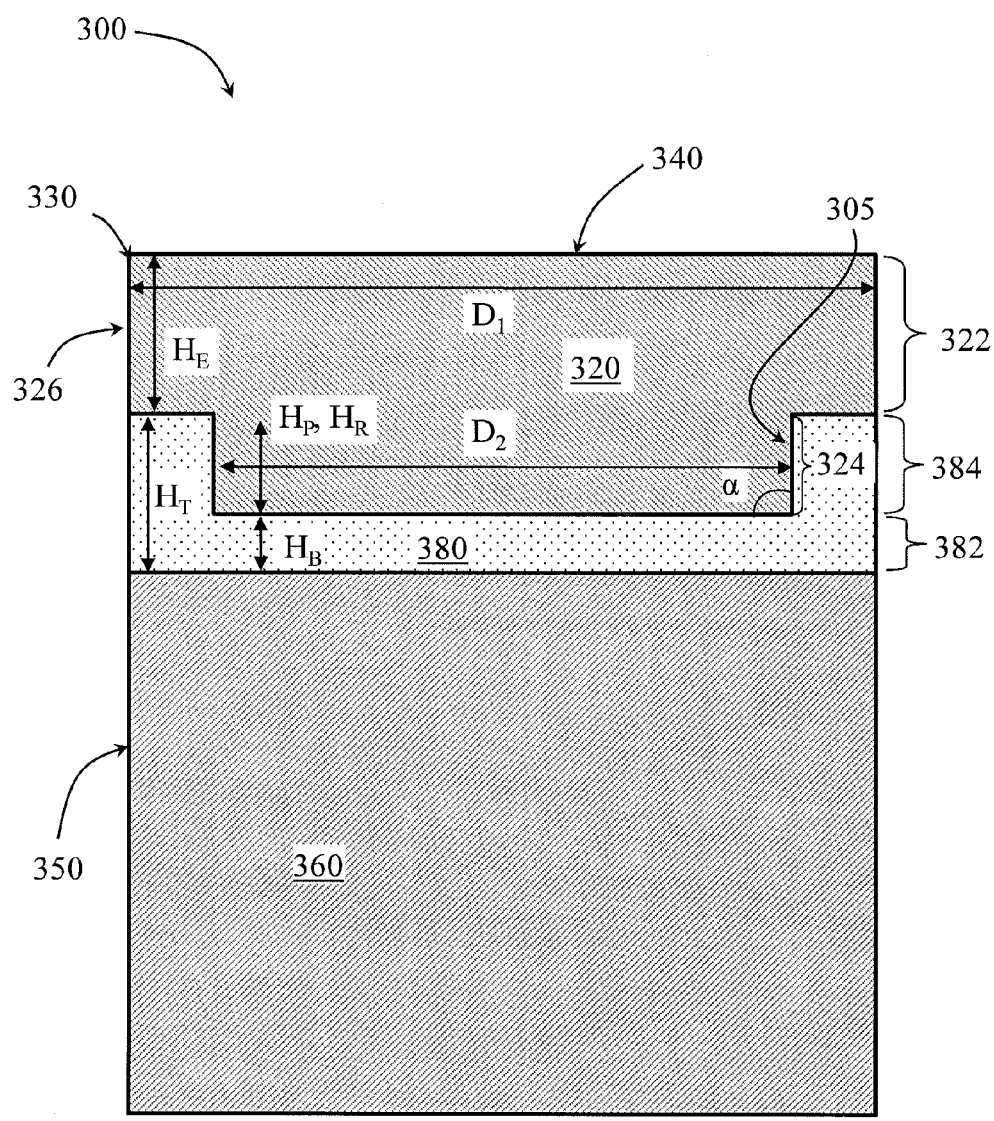
FIG. 3 is a cross-sectional view of a diamond cutting element according to embodiments of the present disclosure.

Referring now to FIG. 3, a cross-sectional view of a cutting element 300 in accordance with embodiments of the present disclosure is shown. The cutting element 300 has a cutting face 340 and a side surface 350, which intersect to form a cutting edge 330. The cutting face 340 and cutting edge 330 may contact and cut away a working surface, such as a well borehole. The cutting element 300 further includes a substrate body 360, a preformed diamond table 320, and an intermediate layer 380 disposed between the substrate body 360 and the diamond table 320. Upon formation of the cutting element 300, the substrate body 360 and the intermediate layer 380 may collectively be referred to as a substrate. For example, in some embodiments, a cutting element may be formed by HPHT processing from a preformed diamond table, an intermediate layer, and a substrate body, wherein the intermediate layer and substrate body form a substrate upon HPHT processing. However, the components of cutting element 300 will be described below as they are prior to formation of the cutting element 300.

In particular, the intermediate layer 380 has a base portion 382 and a ring portion 384, wherein the ring portion 384 has a ring height $H_R$ and the base portion 382 has a base height $H_B$. The total height $H_T$ of the intermediate layer 380 is equal to the sum of the ring height $H_R$ and the base height $H_B$. The preformed diamond table 320 includes a cutting layer 322 and a protrusion 324 extending from the cutting layer 322 into the intermediate layer 380, thereby forming a non-planar interface 305 between the diamond table 320 and the intermediate layer 380. The protrusion height $H_P$ is equal to the ring height $H_R$, which may also be described as the distance between the base portion 382 and the cutting layer 322. Further, as shown in FIG. 3, the intermediate layer 380, including both the ring portion 384 and the base portion 382, is positioned between the preformed diamond table 320 and substrate body 360 in a powder form (indicated by the stippled area). For example, in some embodiments the intermediate layer may be formed of loose pre-sintered carbide powder, such as tungsten carbide and a catalyst material used for diamond sintering (e.g., cobalt, nickel, and iron) or tungsten carbide, an element selected from Group VIII of the Periodic Table, and cubic boron nitride or diamond reinforcements. However, in other embodiments, which are described further below referencing FIG. 4, the ring portion may be in a solid form while the base portion is in a powder form.

Referring still to FIG. 3, the cutting layer 322 of the diamond table 320 has a cutting face 340 and a cutting layer side wall 326, which intersect to form a cutting edge 330. The cutting layer 322 may also be referred to herein as the exposed portion of the diamond table 320, as the cutting layer side wall 326 is exposed as a portion of the cutting element side surface 350. The cutting layer 322 has a cutting layer diameter $D_1$ and an exposed height $H_E$. The protrusion 324 has a protrusion diameter $D_2$ and a protrusion height $H_P$. Protrusion 324 of the diamond table 320 fits within the ring portion 384 and is not exposed to the cutting element side surface 350, and thus $D_1$ is greater than $D_2$.

It is within the scope of the present disclosure that the cutting layer diameter $D_1$ and the protrusion diameter $D_2$ are designed to have a $D_2/D_1$ ratio ranging from about 0.3 to about 0.9. In some embodiments, the $D_2/D_1$ ratio may have a preferred range of about 0.7 to about 0.85. The preferred range or value of the $D_2/D_1$ ratio may vary, depending on the size of the cutting layer 322 and the protrusion 324. Additionally, the ring height $H_R$ and the total height $H_T$ of the intermediate layer 380 are designed to have a $H_R/H_T$ ratio ranging from about 0.1 to about 0.7. In some embodiments, the $H_R/H_T$ ratio may have a preferred range of about 0.3 to about 0.6. Because the ring height $H_R$ is equal to the protrusion height $H_P$, the ratio of $H_R/H_T$ is also equal to the ratio of $H_P/H_T$.

The preferred range or value of the ratio of $H_R/H_T$ or $H_P/H_T$ may vary, depending on the thickness of the cutting layer 322, i.e., the exposed height $H_E$. For example, a cutting layer 322 may have a thickness $H_E$ ranging from about 0.06 to about 0.10 inches, and in some embodiments ranging from about 0.07 to about 0.09 inches. In embodiments having a cutting layer 322 thickness $H_E$ ranging from about 0.06 to about 0.10 inches, the protrusion height $H_P$ to cutting layer thickness $H_E$ ratio ($H_P/H_E$) may range from about 0.1 to about 0.7, and total height $H_T$ may be selected based on the selected protrusion height $H_P$ value to have the desired $H_P/H_T$ ratio. In a preferred embodiment, for example, when a cutting layer thickness $H_E$ ranges from about 0.08 to 0.085 inches, then the protrusion height $H_P$ may be about 0.03 to 0.04 inches. Advantageously, the inventors of the present disclosure have found that by designing a NPI of a cutting element based on the ratios of $D_2/D_1$, $H_P/H_T$ (i.e., $H_R/H_T$), and/or $H_E/H_P$ (i.e., $H_E/H_R$) with values disclosed herein, the cutting element may have reduced amounts of residual stress between a substrate and a preformed diamond table.

Figure 4:
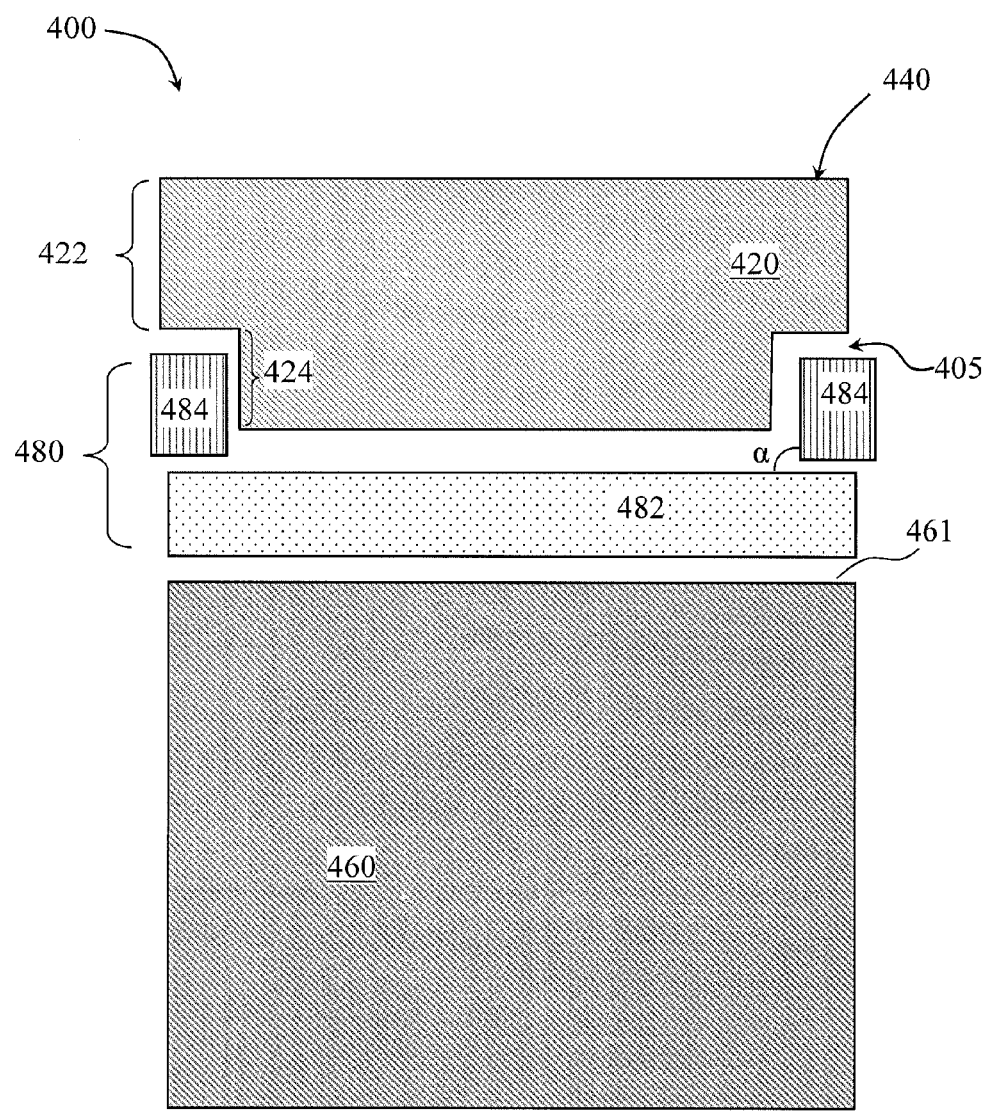
FIG. 4 is a cross-sectional view of a diamond cutting element according to other embodiments of the present disclosure.

According to other embodiments of the present disclosure, the base portion of an intermediate layer may be formed using loose pre-sintered carbide powder and the ring portion may be formed from a solid carbide ring that corresponds with the protrusion of a diamond layer. For example, as shown in FIG. 4, the elements used to form a cutting element 400 according to embodiments of the present disclosure include a substrate body 460, a diamond table 420, and an intermediate layer 480 disposed between the substrate body 460 and the diamond table 420. The substrate body 460 may be provided in the form of a pre-sintered carbide body. The intermediate layer 480 includes a base portion 482 and a ring portion 484, wherein the base portion 482 is formed of loose carbide powder, and the ring portion 484 is formed of a solid carbide ring. In particular, a loose pre-sintered carbide powder, such as tungsten carbide cobalt, may be placed in a base layer 482 on the top surface 461 of the substrate body 460. A preformed solid carbide ring 484 may then be placed over the base layer 482 of carbide powder. The diamond table 420, which includes a cutting layer 422 and a protrusion 424, may then be positioned over the base 482 and ring 484 portions such that the protrusion 424 extends from the cutting layer 422 into the intermediate layer 480. The diamond table 420, intermediate layer 480, and substrate body 460 may then be sintered to form the cutting element 400, wherein a non-planar interface 405 is formed between the diamond table 420 and the carbide intermediate layer 480.

It is within the scope of the present disclosure that a substrate body and an intermediate layer may be formed from the same or different substrate material. Substrate material, as used herein, may include metal-carbide composite material, such as tungsten carbide, held together with a binder material, such as one selected from Group VIII of the Periodic Table. For example, in some embodiments, both the substrate body and the intermediate layer may be made of the same metal-carbide composite material, such as tungsten carbide cobalt. In other embodiments, the substrate body and the intermediate layer may be made of different metal-carbide compositions, depending on the application, such as brazing or abrasion resistance requirements.

Figure 5:
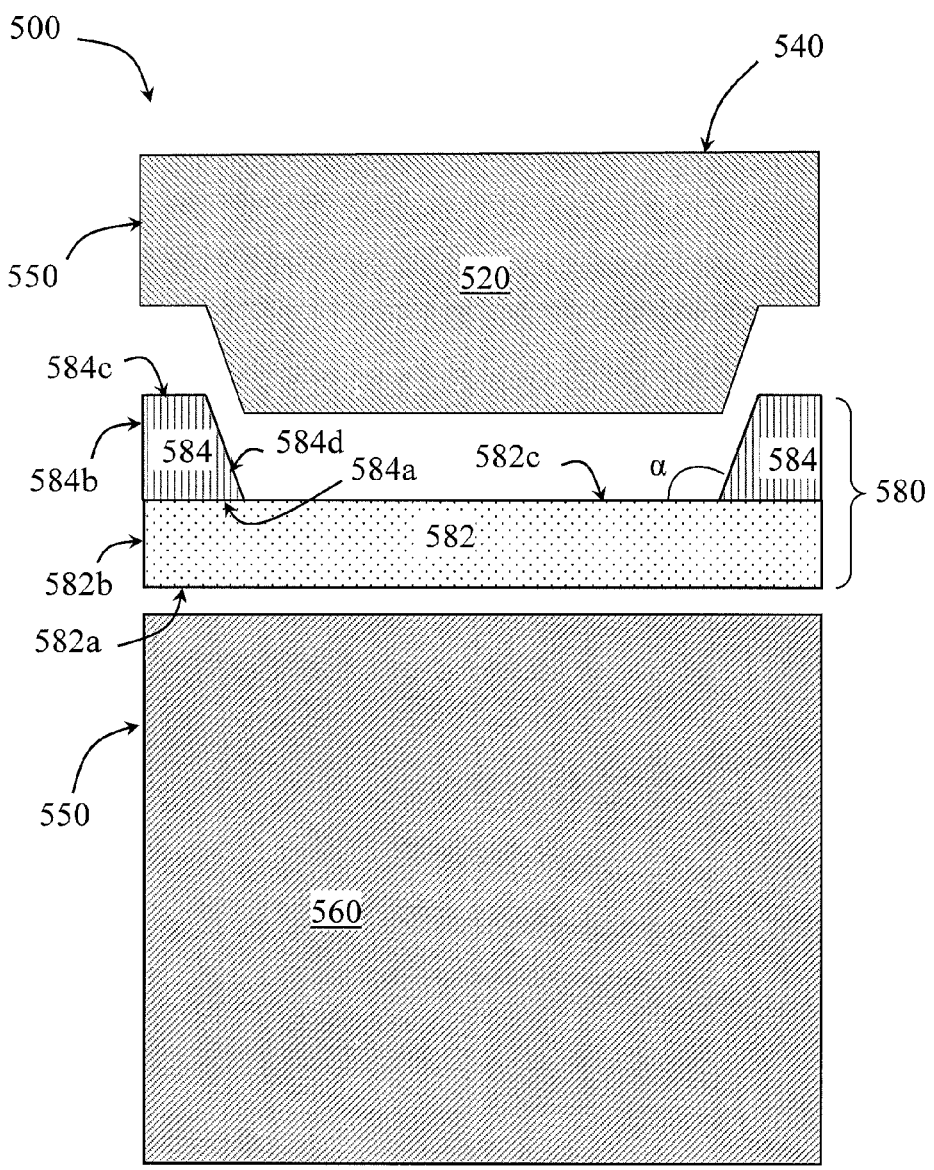
FIG. 5 is a cross-sectional view of a diamond cutting element according to yet other embodiments of the present disclosure.

Furthermore, NPIs of the present disclosure are designed to have a shape described herein. For example, referring to FIG. 5, a cross-sectional view of the elements that form a cutting element according to embodiments of the present disclosure is shown. Cutting element 500 has a cutting face 540 and a side surface 550, wherein the outer side surfaces of each of a diamond table 520, intermediate layer 580, and substrate body 560 of the cutting element 500 collectively form the side surface 550. Further, the intermediate layer 580 comprises a base portion 582 and a ring portion 584, wherein the base portion 582 has a bottom 582a, a side wall 582b, and a top 582c, and wherein the ring portion 584 has a base interface 584a, an outer side wall 584b, a diamond interface 584c, and an inner side wall 584d. The bottom 582a and top 582c sides of the base portion 582 and the base interface 584a and diamond interface 584c of the ring portion 584 are substantially planar and parallel, as shown in FIG. 5, but is not so limited in other embodiments. The side wall 582b of the base portion 582 and the inner and outer side walls 584d, 584b of the ring portion 584 have substantially circumferential surfaces. In particular, in the embodiment shown in FIG. 5, the side wall 582b of the base portion 582 and the outer side wall 584b of the ring portion 584 have substantially the same cylindrical shape and diameters, although the height of each may vary. The inner side wall 584d has a smaller diameter than the outer side wall 584b of the ring portion 584.

As shown in FIG. 5, the inner side wall 584d may slope vertically from the outer side wall 584b to the center of the cutting element 500, such that the base interface 584a is larger than the diamond interface 584c, while the outer side wall 584b may have a substantially vertical wall. Thus, in some embodiments, the cross-section of the ring portion 584 may have a trapezoidal shape. However, as shown in FIG. 4, other embodiments may have a ring portion with substantially parallel side walls, such that the base interface is about equal to the diamond interface, and the cross-section of the ring portion has a rectangular shape.

An angle α is formed between at the intersection of the inner side wall 584d of the ring portion 584 and the top 582c of the base portion 582. Angle α may range from 90° to about 150°. As shown in FIG. 5, angle α may be larger than 90°. In other embodiments, as shown in FIGS. 3 and 4 the angle α formed between the ring portion 384, 484 and the base portion 382, 482 is about 90°. The angle α formed between the ring portion and the base portion of an intermediate layer may depend on the material used to form each portion. For example, in embodiments having a ring portion made of a solid preformed carbide ring, the inner side wall of the ring portion may be preformed to have a substantially vertical wall (parallel with the outer side wall of the ring portion) so that the intersection of the preformed ring portion and the base portion forms an angle α equal to about 90°. However, in some embodiments having the ring portion made of a loose powder, the powder may flow towards the base portion of the intermediate layer, thereby forming a sloped inner side wall of the ring portion. In such embodiments, the sloped inner side wall of the ring portion may form an angle α ranging from 90° to about 150° with the top of the base portion.

It is within the scope of this disclosure that embodiments may have an intermediate layer, wherein at least a portion of the intermediate layer is formed of a loose powder substrate material. For example, as shown in FIG. 3, all of the intermediate layer may be formed of a loose powder substrate material, or as shown in FIGS. 4 and 5, the base portion of the intermediate layer may be formed of a loose powder material while the ring portion is preformed into a solid body. In other embodiments, the ring portion of the intermediate layer may be formed of a loose powder substrate material, while the base portion is preformed into a solid body. Other combinations of using loose powder substrate material and preformed solid substrate material may be used to form the intermediate layer of embodiments according to the present disclosure. Embodiments of the present disclosure may also have a substrate (including the substrate body and intermediate layer sections) made entirely of a solid carbide body.

Embodiments of the present disclosure having at least a portion of an intermediate layer formed of a loose powder substrate material (such as powdered tungsten carbide) may also include an organic binder (such as wax, polyvinyl alcohol, polyvinyl butyral, etc.) for better shaping and matching. The binder may later burn out upon formation of the cutting element.

Advantageously, inventors of the present disclosure have found that by forming a portion of the diamond layer to protrude into the substrate (rather than prior art embodiments that have a portion of the substrate protruding into the diamond layer), the amount of sintering stress may be reduced and the interface residual stress may be reversed. In particular, the sintering stress formed in the shear cutter pressing and the residual stress due to the thermal expansion mismatch between the diamond table and the carbide substrate both result in the overall residual stress created in shear cutters. By forming a NPI according to embodiments disclosed herein, the overall residual stress may be reduced. Further, the overall residual stress distribution may be improved through the NPI design described herein. For example, the diamond protrusion may deflect the residual stress into the carbide substrate, leaving the cutting edge of the cutter with less residual stress interruptions. Additionally, using the features of the diamond table protrusion may require using less substrate powder charge, and thus minimize the volume shrinkage of the powder compact.

Figure 6:
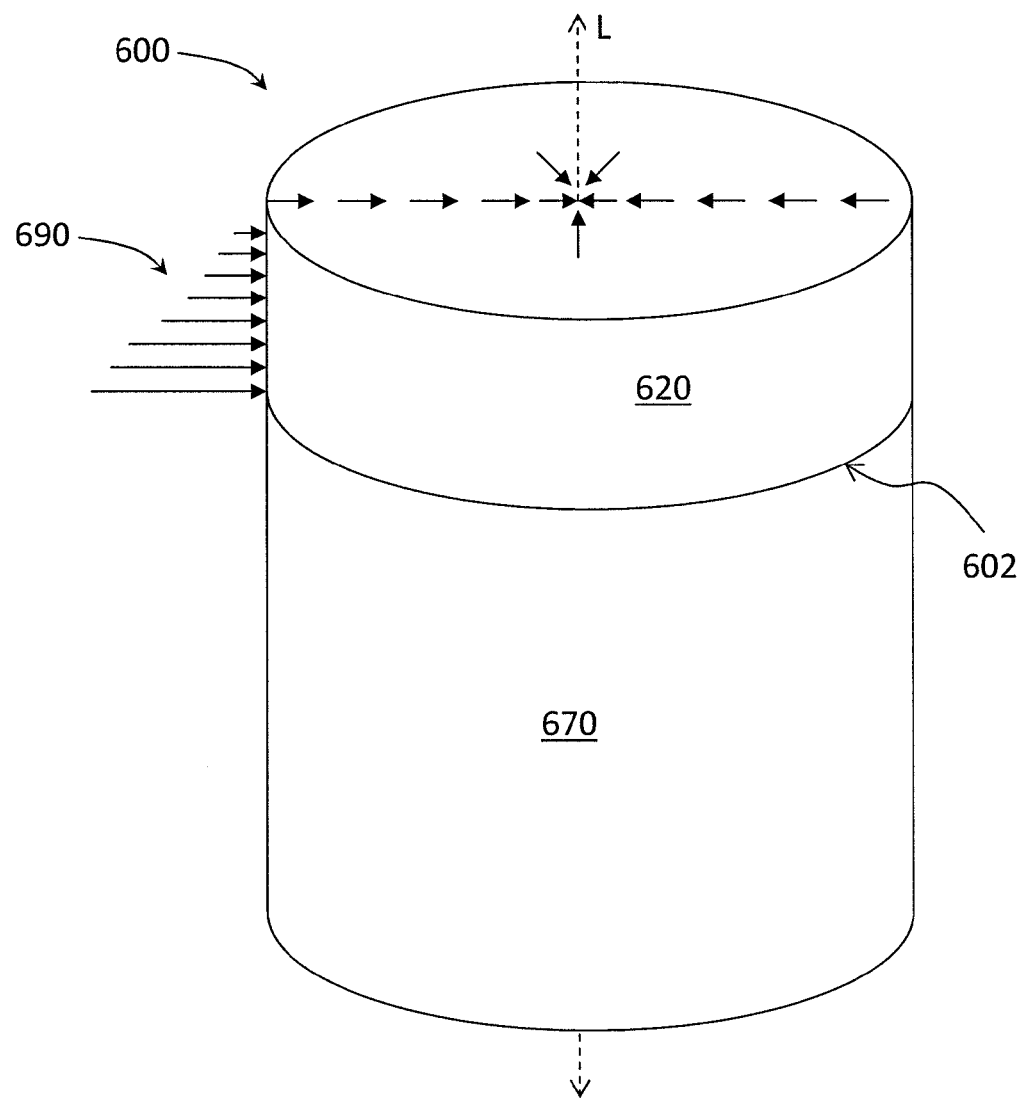
FIG. 6 shows compressive forces experienced by a shear cutter.
Figure 7A:
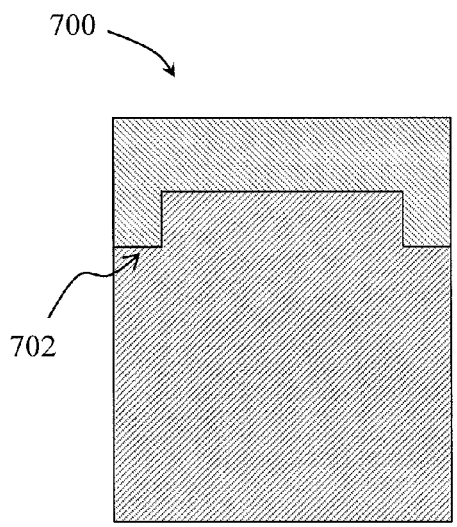
FIGS. 7A-7C show cross-sectional views of conventional shear cutters and a TSP shear cutter according to the present disclosure.
Figure 7B:
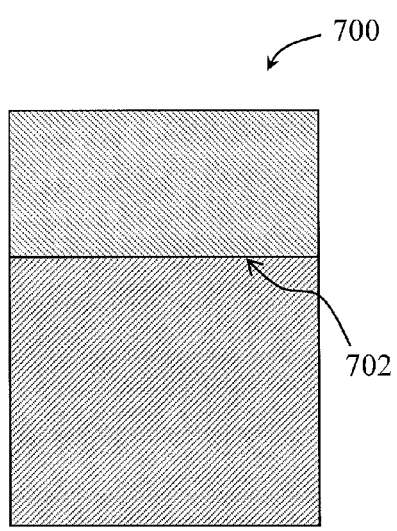
Figure 7C:
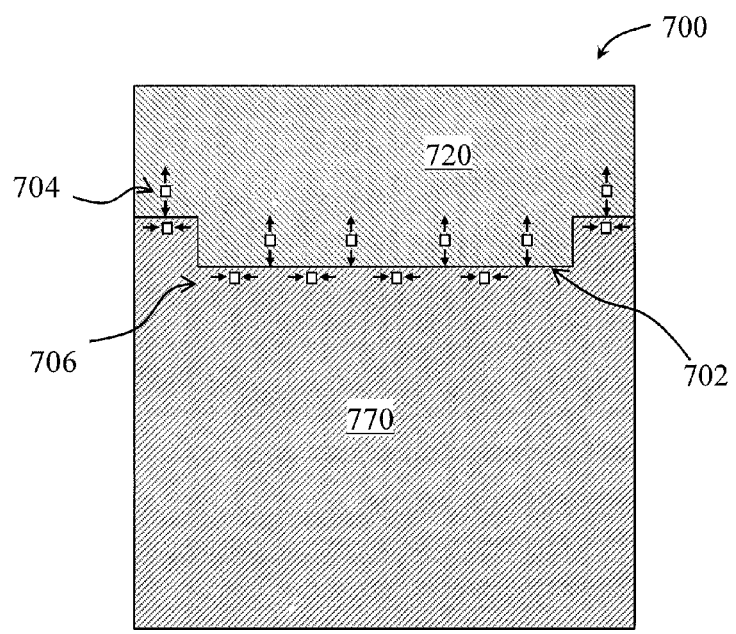

In general, a shear cutter having a preformed diamond table attached to a substrate may experience compression forces after undergoing the HPHT process due to the thermal expansion mismatch between the diamond table and the substrate. As shown in FIG. 6, the magnitude of compression forces 690 typically increases towards the interface 602 between the preformed diamond table 620 and the substrate 670 and towards the center axis L of the cutter 600. Further, the diamond material near the interface undergoes tensile stresses, while the substrate undergoes compressive stress. However, by using a NPI according to the present disclosure, the stresses may be distributed to improve the life of the cutter. For example, referring to FIGS. 7A-C, a TSP shear cutter having a NPI according to the present disclosure is compared with a PCD shear cutter having a conventional NPI and a conventional TSP shear cutter having a planar interface. Specifically, FIG. 7A shows a cross sectional view of a PCD shear cutter 700 having a conventional NPI 702 and FIG. 7B shows a cross sectional view of a conventional TSP shear cutter 700 having a planar interface 702. FIG. 7C shows a cross-sectional view of a TSP cutter 700 having a NPI 702 according to the present disclosure. As shown, the diamond material near the interface 702 undergoes tensile stresses 704 while the substrate counterpart undergoes compressive stresses 706. Advantageously, by forming a NPI according to embodiments of the present disclosure, the tensile stress band 704 in a preformed diamond table 720 near the interface 702 may guide any interfacial cracking towards the substrate 770, and thus, may avoid straight interfacial delamination that may occur in cutters such as the one shown in FIG. 7B and early cutting edge loss that may occur in cutters such as the one shown in FIG. 7A. Additionally, when substrate powder material is used adjacent to the diamond table, the protrusion portion of the diamond table in NPIs according to the present disclosure may reduce the compression forces caused by densification/shrinking of the powder during HPHT processing.

Furthermore, reduction of overall residual stress may especially be seen in TSP shear cutters having a NPI design according to embodiments of the present disclosure. In particular, residual compressive stress of a TSP shear cutter, which re-bonds a pre-sintered diamond table onto a substrate, may be significantly less than that of a conventional shear cutter, which is formed with diamond powder, due to the densification of the diamond powder and the catalyst material loss from the substrate in conventional shear cutter formation. Similarly, the residual compressive stress of a TSP cutter may be significantly higher if a layer of powdered substrate material (intermediate layer) is introduced between the substrate body and the pre-sintered TSP table. Advantageously, by forming a TSP shear cutter having a NPI according to the present disclosure, the cutter may have improved distribution of the residual stress, and thus, may further increase the life of the cutter.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method of forming a cutting element, comprising:
forming a substrate body;
forming an intermediate layer on the substrate body after the substrate body has been formed, wherein the intermediate layer comprises:
a base portion having a base height;
a ring portion having a ring height $H_R$; and
wherein the intermediate layer has a height $H_T$ equal to the sum of the base height and ring height;
forming a diamond table, wherein the diamond table comprises:
a cutting layer having a cutting layer diameter $D_1$ and a cutting layer height $H_E$;
a protrusion extending axially along a central axis of the diamond table, the protrusion having a protrusion diameter $D_2$ and a protrusion height $H_P$; and
positioning the diamond table on the intermediate layer, such that the intermediate layer is disposed axially between the substrate body and the diamond table.

2. The method of claim 1, further comprising subjecting the substrate body, intermediate layer, and diamond table to HPHT processing.

3. The method of claim 1, wherein the diamond table comprises thermally stable polycrystalline diamond.

4. The method of claim 1, further comprising forming an angle at an intersection of an inner surface of the ring portion and a top surface of the base portion, wherein the angle is at least 90°.

5. The method of claim 4, wherein the angle is between 90 and 150°.

6. The method of claim 1, wherein a ratio of $H_R/H_T$ ranges from about 0.1 to about 0.7.

7. The method of claim 6, wherein the ratio of $H_R/H_T$ ranges from about 0.3 to about 0.6.

8. The method of claim 1, wherein a ratio of $D_2/D_1$ ranges from about 0.3 to about 0.9.

9. The method of claim 8, wherein the ratio of $D_2/D_1$ ranges from about 0.7 to about 0.85.

10. The method of claim 1, wherein the cutting layer has a thickness ranging from about 0.06 to about 0.10 inches.

11. The method of claim 10, wherein the cutting layer thickness ranges from about 0.07 to about 0.09 inches.

12. The method of claim 1, wherein at least one of the ring portion and the base portion comprises a loose powdered substrate material.

13. The method of claim 12, wherein the loose powdered substrate material comprises pre-sintered tungsten carbide.

14. The method of claim 1, wherein the substrate body and the intermediate layer comprise the same substrate material.

15. The method of claim 1, wherein the substrate body and the intermediate layer comprise different substrate material.

16. The method of claim 1, wherein a ratio of $H_P/H_E$ ranges from about 0.1 to about 0.7.

17. A cutting element, comprising:
a central axis extending axially through the cutting element;
a diamond table, comprising:
a cutting layer having a cutting layer diameter $D_1$ and a cutting layer height $H_E$; and
a protrusion extending axially along the central axis, the protrusion having a protrusion diameter $D_2$ and a protrusion height $H_P$;
a substrate mounted to the diamond table, the substrate comprising:
a substrate body; and
an intermediate layer disposed between the substrate body and the diamond table, the intermediate layer comprising:
a base portion having a base height;
a ring portion having a ring height $H_R$; and
wherein the intermediate layer has a height $H_T$ equal to the sum of the base height and ring height;
wherein the substrate body and the intermediate layer comprise different substrate material; and
a non-planar interface formed between the diamond table and the intermediate layer, wherein the protrusion extends from the cutting layer into the substrate.

18. The cutting element of claim 17, further comprising an angle formed at an intersection of an inner surface of the ring portion and a top surface of the base portion, wherein the angle is at least 90°.

19. The cutting element of claim 18, wherein the angle is between 90 and 150°.

20. The cutting element of claim 17, wherein a ratio of $H_R/H_T$ ranges from about 0.1 to about 0.7.

21. The cutting element of claim 20, wherein the ratio of $H_R/H_T$ ranges from about 0.3 to about 0.6.

22. The cutting element of claim 17, wherein a ratio of $D_2/D_1$ ranges from about 0.3 to about 0.9.

23. The cutting element of claim 22, wherein the ratio of $D_2/D_1$ ranges from about 0.7 to about 0.85.

24. The cutting element of claim 17, wherein the cutting layer has a thickness ranging from about 0.06 to about 0.10 inches.

25. The cutting element of claim 24, wherein the cutting layer thickness ranges from about 0.07 to about 0.09 inches.

26. The cutting element of claim 17, wherein at least one of the ring portion and the base portion comprises a loose powdered substrate material.

27. The cutting element of claim 26, wherein the loose powdered substrate material comprises pre-sintered tungsten carbide.

28. The cutting element of claim 17, wherein a ratio of $H_P/H_E$ ranges from about 0.1 to about 0.7.

* * * * *